F. X. KUHN.
CUTTING OR SLICING MACHINE.
APPLICATION FILED JAN. 24, 1917.

1,368,442.

Patented Feb. 15, 1921.
8 SHEETS—SHEET 1.

Inventor:
Frederick Xenophon Kuhn
by Emery, Booth, Janney & Varney,
Attys.

F. X. KUHN.
CUTTING OR SLICING MACHINE.
APPLICATION FILED JAN. 24, 1917.

1,368,442.

Patented Feb. 15, 1921.
8 SHEETS—SHEET 4.

Inventor:
Frederick Xenophon Kuhn,
by Emery, Booth, Janney & Varney
Attys.

F. X. KUHN.
CUTTING OR SLICING MACHINE.
APPLICATION FILED JAN. 24, 1917.

1,368,442.

Patented Feb. 15, 1921.
8 SHEETS—SHEET 5.

Fig. 8.

Inventor:
Frederick Xenophon Kuhn

F. X. KUHN.
CUTTING OR SLICING MACHINE.
APPLICATION FILED JAN. 24, 1917.

1,368,442.

Patented Feb. 15, 1921.
8 SHEETS—SHEET 6.

UNITED STATES PATENT OFFICE.

FREDERICK XENOPHON KUHN, OF BROOKLINE, MASSACHUSETTS.

CUTTING OR SLICING MACHINE.

1,368,442.  Specification of Letters Patent.  Patented Feb. 15, 1921.

Application filed January 24, 1917. Serial No. 144,290.

*To all whom it may concern:*

Be it known that I, FREDERICK XENOPHON KUHN, a citizen of the United States, and a resident of Brookline, county of Norfolk and Commonwealth of Massachusetts, have invented an Improvement in Cutting or Slicing Machines, of which the following description, in connection with the accompanying drawings, is a specification, like characters on the drawings representing like parts.

This invention relates to cutting or slicing machines, and more particularly to machines for cutting slabs or blocks of plastic or other relatively soft material, such as ice-cream or other frozen materials, into smaller portions or bricks.

One of the objects and aims of the invention is to provide a machine of the character referred to which shall be of simple construction, easy of manipulation and efficient and rapid in operation. These and other objects and aims of the invention will be best understood from the following description, taken in connection with the accompanying drawings, of one form or embodiment of the invention shown and described for illustrative purposes, it being understood that the invention in its true scope is definitely set forth by the claims.

In the drawings:

Fig. 7 is a detail of the plate 108 joining the cutting block 104 to the block 84;

Figure 1:
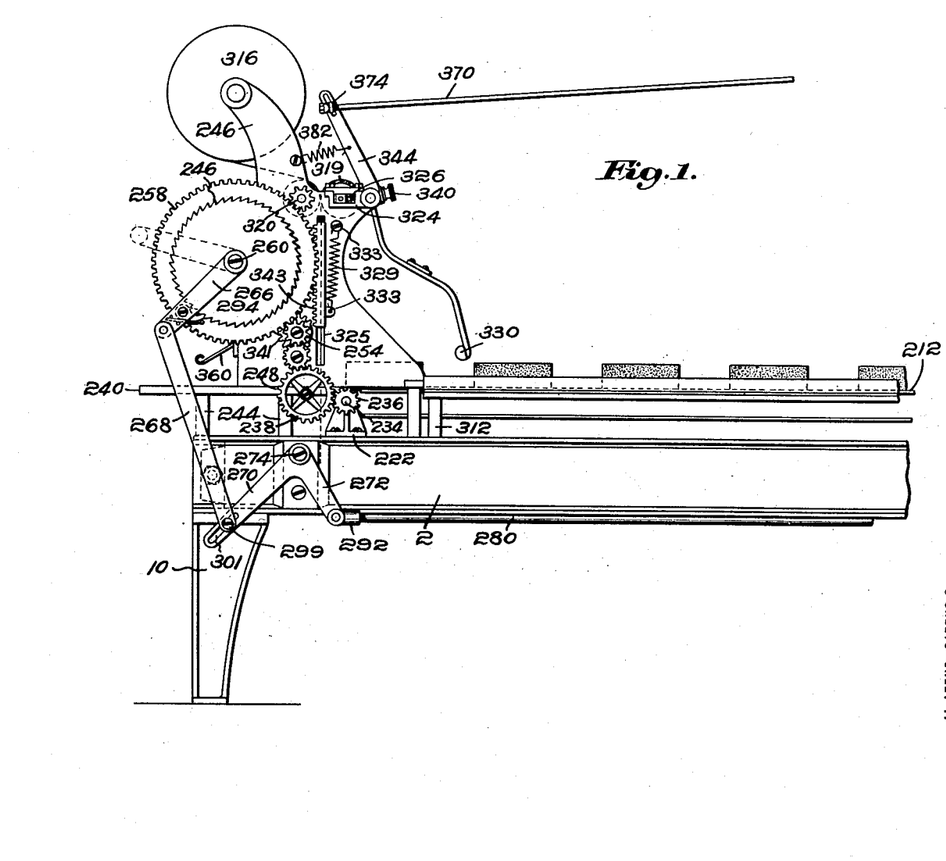
Figure 1 is a side elevation of one end of a cutting or slicing machine, illustrating more particularly one form of wrapping mechanism forming part of the invention.
Figure 2:
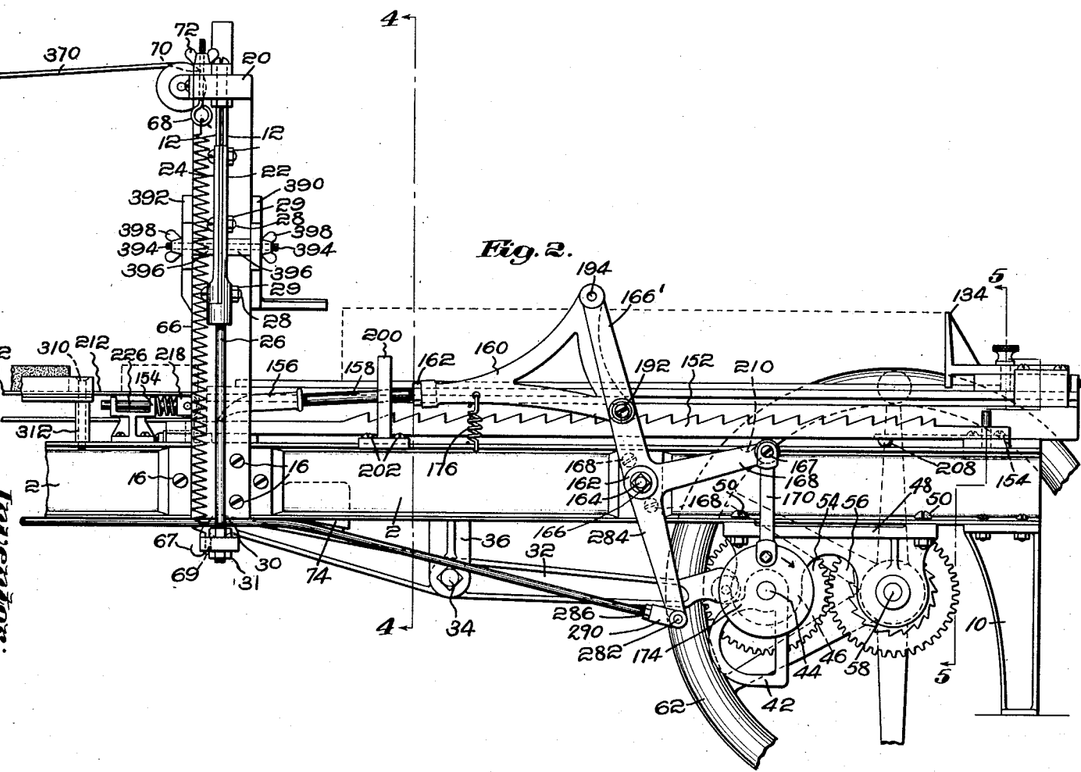
Fig. 2 is a side elevation of the end of the machine opposite to that shown in Fig. 1, illustrating more particularly one form of feeding and cutting means embodying the invention.
Figures 2, 3:
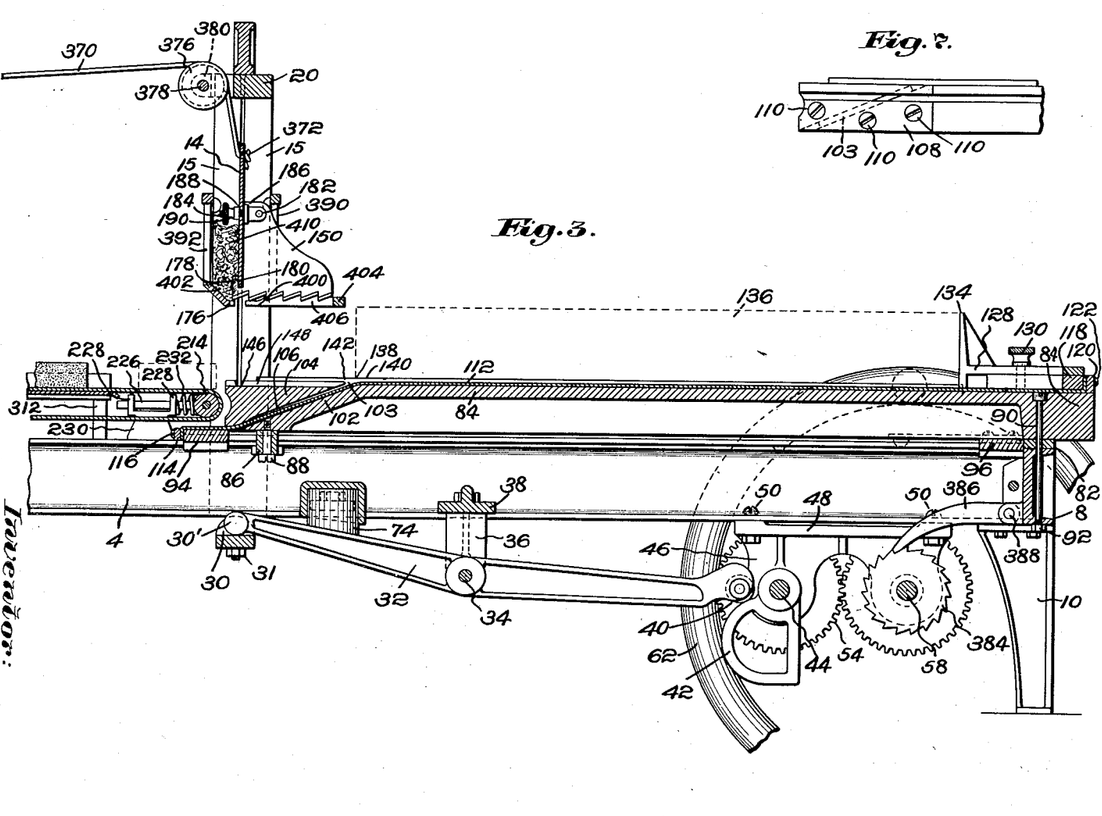
Fig. 3 is a central longitudinal section of the machine shown in Fig. 2.
Figure 11:
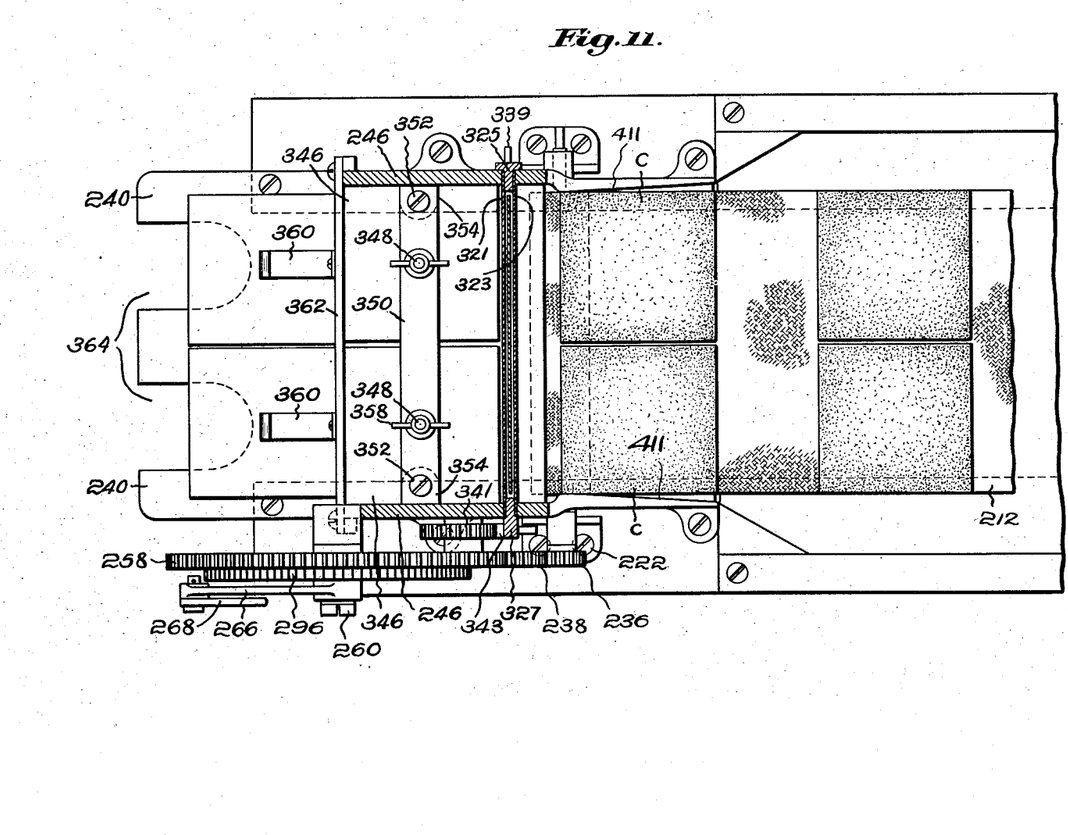
Fig. 11 is a plan section on line 11—11 of Fig. 8.

In the illustrative embodiment of the invention shown in the drawings, the frame of the machine may be of any suitable construction, said frame herein including two longitudinally extending side frame members 2 and 4 joined at or near their ends by transverse frame members 6 and 8, Figs. 1, 3 and 11. Said longitudinally extending side frame members may conveniently consist of I-irons, and the transverse end frame members of U-irons, said side frame members and end frame members being rigidily bolted or otherwise suitably secured together. At each corner of the rectangular frame there is preferably provided a supporting leg 10, bolted or otherwise secured to the lower flange of the I-irons 2 and 4.

The cutter or slicing means and its actuating mechanism will be first described. The cutter or slicing means is supported by two uprights secured at their lower ends, one to the outside of each of the I-irons 2 and 4, said supports being herein located in the same transverse plane of the machine. These uprights may be of any suitable construction but herein they also serve as guides for the cutter proper and to that end will preferably each consist of two angle-irons placed side by side, so that their flanges 12—12, Figs. 2 and 4, that are directed transversely to the machine, will be separated throughout their length by a space slightly wider than the thickness of the transverse cutter blade 14 said angle irons being bolted by their flanges 15, 15, Figs. 2 and 3, to the webs of said I-irons 2 and 4 by bolts 16 passing through wooden blocks 18 fitted into the outside recess of each of said I-irons, Fig. 4. At their upper ends said angle irons are received into suitably shaped recesses provided in a cross head 20.

The transverse cutter blade 14 extends between the flanges 12—12, 12—12 of the two pairs of angle irons above described, the lateral marginal portions of said blade projecting sufficiently beyond the outer edges of said angle iron flanges 12 to enable said marginal portions to be clamped, Fig. 2, between the two sections 22 and 24 of the upper portion of the rods 26, by bolts 28, which pass through holes provided for that purpose in the marginal portions of said blade and are provided upon their other ends with clamping nuts 29.

Figure 4:
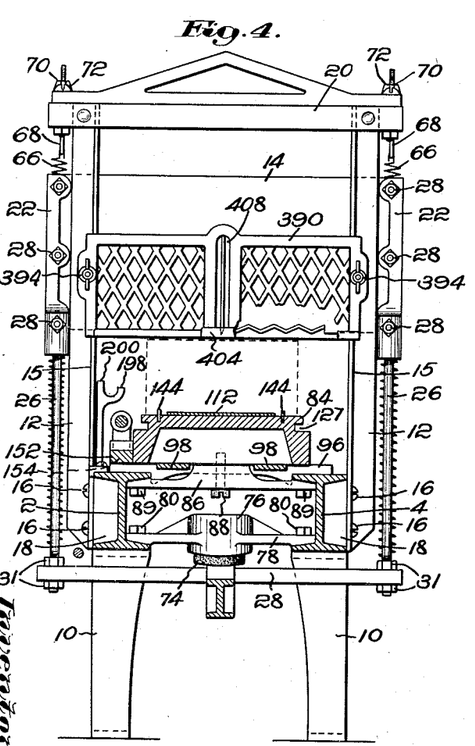
Fig. 4 is a vertical cross section on line 4—4, Fig. 2.

The lower ends of the two rods 26 are screw threaded and extend through openings provided in the opposite ends of a cross piece 28, said screw threaded ends of the rods 26 receiving clamping nuts 31, Fig. 4, upon opposite sides of said cross piece 28, whereby said cross piece is rigidly clamped to the lower ends of said rods. The cross piece 28 is provided half-way intermediate its ends, upon its upper surface, with a ball socket 30 adapted to receive the spherical end 30', Fig. 3, of a two-arm lever 32, thus forming a ball and socket joint, said lever 32 being fulcrumed at 34 between the lower ends of the two ears 36—36 projecting downwardly from a bracket 38 bolted at its opposite ends to the inner lower horizontal flanges of the I-irons 2 and 4. The right end viewing Fig. 3, of the lever 32 is provided with a cam roll 40 adapted to coöperate with a cam 42 secured to a transverse shaft 44 journaled in ears 46, Figs. 2 and 3, extending downwardly from brackets 48 bolted to the end surface of the I-irons 2 and 4 by bolts 50. The shaft 44 will preferably extend outside of the I-iron 4, sufficiently to receive thereon a gear 54, Figs. 2 and 3, said gear meshing with another gear 56, fast upon a transverse shaft 58 journaled in ears 60, 60 also extending downwardly from the brackets 48 above referred to. Secured to the right end of the shaft 58 is a fly wheel 62 provided with a handle 64.

Herein the cam roll 40 is maintained in contact with the cam 42 by springs 66, 66, the lower hooked ends 67 of which engage openings 69 provided in opposite ends of the cross piece 28, one of said hooked ends 67 and perforations 69 being shown in Fig. 2. The upper hooked ends of said springs 66 engage eyes 68, 68 provided upon the lower ends of rods 70 which pass through perforations provided in the opposite ends of the cross head 20 and are provided upon their upper screw threaded end portions with wing nuts 72, whereby the tension of said springs may be adjusted as desired.

It will be apparent that by rotation of the fly wheel 62 in a contra-clockwise direction, by means of the handle 64, the cam 42 will, through the shaft 58, intermeshing gears 56, 54 and shaft 44, be rotated in the direction of the arrow in Fig. 2 and by its action upon the cam roll 40, will raise the right end of the lever 32 and lower the left end of said lever, together with the cross head 28 and knife 14 through the connections previously stated. Said cam 42 is so shaped that it will continue to lower the knife until the cam roll 40 passes off the rear end of said cam, Fig. 2, whereupon the lever 32 being released from the action of said cam, its left end, Fig. 2, and knife 14 will quickly be raised by the action of the springs 66 and will be maintained in raised position until, in the further rotation of the shaft 44 the leading end of the cam 42 again reaches the position shown in Fig. 2 and repeats its action upon the cam roll 40 to again lower the knife in position to the traction of the springs 66. The intervals between successive actions of the cam 42 upon the cam roll 40 of the lever 32 are availed of, as will hereinafter be more fully described, to effect the feed of the material to be cut.

Means will preferably be provided to deaden the upward stroke of the knife 14 toward the end of said upward stroke, said means herein comprising a cylindrical buffer 74 made of rubber or any other suitable material, secured in any suitable manner upon the upper surface of the left end, Fig. 3, of the lever 32 and adapted to enter a cylindrical recess provided in a box 76 preferably integral with a bracket 78 secured by bolts 80, 80, Fig. 3, to the lower inner flanges of the I-irons 2 and 4.

The invention includes means to feed the material to be cut, and one illustrative form of such feeding means will now be described.

Upon the rear transverse member 8, Fig. 3, of the frame there rests a block 82 upon which is supported a block 84 extending longitudinally of the machine, said block 84 being preferably hollowed out upon its under side. Said block 84 is supported adjacent its forward end by a transverse bracket 86, Figs. 3 and 4, to which it is secured by a screw 88, said bracket 86 being secured by screws 89, 89, or in any other suitable manner, at its opposite ends to the under side of the upper inner flanges of the I-irons 2 and 4. A screw 90 having its head countersunk in the upper surface of the block 84 extends downwardly through the other end of said block, and also through the block 82 and the two flanges of the transverse rear frame member 8, and receives upon its lower end a nut 92, thus clamping the rear end of the block 84 firmly to the frame.

The bracket 86 extends the depth of the block 82 above the upper surface of the I-irons 2 and 4, the lower surface of the block 84 being thus separated from the upper surfaces of the two I-irons 2 and 4 by a distance equal to the depth of said block 82. This is to provide the necessary clearance for the feed carriage which slides upon the upper surfaces of the I-irons 2, 4 underneath the block 84. To this end the feed carriage in the present embodiment of the invention comprises two transverse members 94 and 96, Figs. 3, 4 and 5, joined by two longitudinal members 98, shown in section in Figs. 4 and 5. Said transverse feed carriage members rest with their end portions in sliding engagement with the upper surfaces of the I-irons 2 and 4 and are provided with downwardly extending lugs 100 which engage the edges of the inwardly directed upper flanges of the I-irons 2 and 4 and thus guide the feed carriage in its feeding movement and prevent displacement thereof transversely of the machine. The front or left end, Fig. 3, of the block 84 terminates in an inclined surface 102. To the front end of said block 84, Fig. 3, is secured a triangular block 104, the inclined end surface 102 of the block 84 being spaced from the opposed parallel inclined surface 106 of the block 104 a sufficient distance to form a narrow inclined space or slot 103 extending transversely of said blocks. The block 104 may be secured to the end of the block 84 in any suitable manner, but herein, Fig. 7, two plates 108 are preferably used for this purpose, said plates being applied to the lateral surfaces of the blocks 104 and 84 and secured to said blocks by screws 110, one of said plates being best shown in said Fig. 7.

A belt 112 is secured at one end to the front transverse member 94 of the feed carriage, the forward edge of said belt being for that purpose herein, for example, held between said forward edge and a clamping member 114 secured to said transverse member by screws 116 which extend through said belt and into said transverse member 94, Fig. 3. The belt 112 extends backwardly, up through the inclined slot 103 between the inclined surfaces 102, 106 of the blocks 84 and 104, respectively, and then continues along the top surface of the block 84, longitudinally of the latter and is clamped at its rear end to the rear surface of a traveler 118, Fig. 3, for example, by a clamping member 120 secured to the rear edge of said traveler by screws 122 that extend through the end portion of said belt and into said traveler. The traveler 118 has secured to its upper surface at its opposite sides by means of screws 123, guide members 124, said guide members extending downwardly along the sides of said traveler and having inwardly projecting edges 126 that engage guide slots 127, 127, Figs. 4 and 5, extending longitudinally of the block 84.

Figures 5, 6:
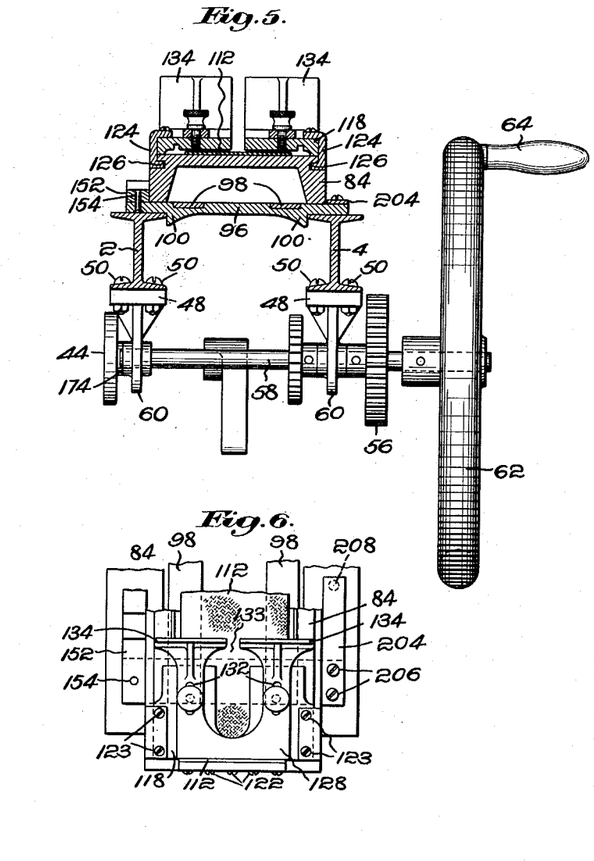
Fig. 5 is a vertical cross section on line 5—5 of Fig. 2.
Fig. 6 is a top plan view of the parts shown in Fig. 5.

The traveler 118 carries a follower 128, Fig. 3, said follower being preferably adjustably secured to the upper surface of said traveler by means of clamping screws 130 extending through slots 132 in said follower and screw threaded into said traveler whereby the follower may be adjusted longitudinally of the machine. It will be noted from Fig. 5 that both the traveler and follower are substantially U-shaped with the open end directed toward the front end of the machine, said follower being provided at its open end at each side of the opening 133 with a vertical follower surface 134, 134. The belt 112, as is shown in Fig. 5 is not as wide as the top surface of the block 84.

From the above described construction, it will be apparent that if the block or slab 136 of ice-cream or other material to be cut be placed upon the block 84 with its right end, Fig. 2, abutting against the follower surfaces 134, 134, it will rest with its marginal portions upon the upper surface of the block 84 and between said marginal portions will rest upon the belt 112, and if the feed carriage, composed of the longitudinal members 98 and transverse members 94, 96, be advanced from the position shown in Fig. 3 toward the left, referring to said figure, said block 136 of ice-cream or other material will be fed beneath the knife 14, owing to the frictional engagement with said belt 112 of that portion of the under face of said block or slab 136 resting thereon, since said belt is secured to the feed carriage as above described. If desired, a suitable anti-friction roll of any usual construction may be provided at the upper forward edge of the block 84. The belt 112 will pass over said roll at the point where it inclines downwardly from the horizontal and friction will thus be diminished.

Means are herein provided to guide the block or slab of ice-cream 136 in its feeding movement, said means herein preferably comprising one or more, herein two, parallel knifelike blades 144 extending longitudinally of the upper surface of the blocks 84 and 104 at each side of the belt 112, said blades being embedded in slits provided in the upper surface of said blocks and projecting from said surface a sufficient distance so that when the block of ice-cream or other plastic material is positioned upon the block or feed table 84, said blades will embed themselves in the under surface of the block or slab of ice-cream and will thus guide the latter and prevent transverse displacement thereof while it is being fed.

The block 104 constitutes the cutting block of the machine and will preferably be provided in its upper surface with transverse and longitudinal slots 146, 148, respectively, to receive the cutting edges of the knife 14 and knife 150 (which latter will hereinafter be more fully described) as said knives complete their cutting movement, thus insuring complete and thorough severance of the material to be cut.

As one form of feeding means for the feed carriage, I herein use a rack and pawl. The rack 152 will preferably be removably mounted upon the feed carriage, at one side of the feed table 84, and to that end dowel pins 154, 154 will preferably be provided in the transverse members 94, 96 of the carriage, said dowel pins projecting from the upper surfaces of said transverse members at the left side of the feed table 84 and engaging holes provided in the under surface of said rack.

The pawl 156 which coöperates with the teeth of the rack 152 will preferably be adjustable, and as one means to that end, said pawl herein has screw threaded connection with one end of a rod 158, the other end of which has screw threaded connection with one end of a triangular member 160. The screw threaded connection of the rod 158 with the member 160 enables the pawl 156 to be adjusted lengthwise of the rack and locking means, herein a set nut 162 is provided to lock the pawl in adjusted position. The pawl is actuated by a bell crank lever fulcrumed at 162 upon a stud 164 mounted in a wooden block 166 secured in the outside recess of the I-irons 2 by screws 168. Said triangular member 160 is connected in a manner hereinafter more fully described, to the arm 166' of said bell crank lever, while the other arm 168 of said bell crank lever is pivoted at 167 to one end of a link 170 having its other end pivoted to a crank pin projecting from the outer surface of a crank disk 174 mounted upon the end of the shaft 44 at the outside of the I-iron 2. It will be apparent that when the fly wheel 62 is rotated in a contra-clockwise direction, Fig. 2, the crank disk 174 will be rotated, through the shaft 58, intermeshing gears 54 and 56 and shaft 44, in the direction of the arrow shown in Fig. 2 upon said crank disk and this rotation of the crank disk will, through the link 170, cause the bell crank lever 166, 168 to be rocked about its fulcrum 164, thereby reciprocating the pawl 156. The latter is maintained in yielding engagement with the teeth of the rack 152 by a spring 176 secured at one end to the outside upper flange of the I-iron 2 and at its other end to the triangular member 160, so that if the feed carriage be moved forward or to the left, Fig. 2, sufficiently to bring the leading tooth of the rack beneath the pawl 156 and the fly wheel 62 be then rotated in a contra-clockwise direction, Fig. 2, the feed carriage, feed belt and material to be cut thereon will be fed forward intermittently or step by step under and past the vertically reciprocating knife 14, the knife actuating mechanism and feed mechanism being so timed that the material is fed forward one step between every two reciprocations of the cutter.

Preferably, the cutter means in accordance with the present invention will be adapted at each cutting stroke to sever a single piece or a plurality of pieces simultaneously from the main slab or block 136 of the material to be divided, and to that end, the invention contemplates the use of cutter means having one or a plurality of cutting blades.

In carrying out this feature of the invention, the cutter means is accordingly provided with a plurality of cutting blades, herein the two cutter blades 14 and 150 above referred to, the latter being detachably secured to the former by any suitable means. Herein for this purpose, the blade 14 is provided at its lower edge at a point half-way between its two side edges, with a vertical slot 176 of a width substantially equal to the thickness of the blade 150, and the latter blade 150 is provided with a projecting portion 178 having therein a downwardly extending slot 180 of substantially the width of the knife 14, the inner edge of said slot being flush with the vertical edge of the knife 150. Near its upper edge there is secured at 182 to the knife 150 a screw-threaded stud 184 provided with a shoulder 186 and adapted to extend through a suitable opening 188 provided in the knife 14 at a point half way between the two vertical edges of said knife and at such a distance from the latter's lower edge that when the projection 178 of the knife 150 is inserted in the slot 176 of the knife 14 and the knife 150 is raised, until the inner end wall of the two slots 176 and 180 are in contact, the threaded portion of the stud 184 can be passed through the opening 188 in the blade 14. A clamping nut 190 is then screwed on to the screw threaded portion of the stud 184, thus clamping the knife 14 firmly between said nut and the shoulder 186, both knives being firmly held to each other at their lower edges by the mutually engaging slot arrangement above described. The cutting edges of the cutter blades or knives 14 and 150 will preferably be serrated or toothed substantially as indicated in Fig. 3.

In practice, the block of ice-cream 136 is placed in the machine as indicated in dotted lines in Fig. 2 with its rear end against the follower surfaces 134, 134 and is then moved forward by hand with the aid of said surfaces until the left end surface (referring to Fig. 2) of said block 136 is substantially flush with the right hand edge of the slot 146 into which the cutting edge of the knife 14 enters on the completion of the latter's cutting movements. If now the fly wheel 62 be turned as already described the knives, which up to this time were in raised position, will be moved downwardly, the knife 14 moving downwardly adjacent the left end surface of the block 136, Fig. 3, and the knife 150 making a longitudinal cut in said block centrally of the latter. Continued rotation of the fly wheel 62 will cause the knives to be rapidly raised and the block 136 to be thereupon fed forward by the reciprocating pawl 156, the length of a tooth of the rack 152. The knives then again descend and this time the knife 14 severs from the end of the block two pieces owing to said block having at that point been divided vertically into two portions by the previous stroke of the knife 150. Two pieces are thus severed from the block 136 by the knife 14 at each subsequent cutting stroke of the cutter means, the knife 150 at each stroke prolonging the cut it had previously made.

In practice, cakes of ice-cream are all usually of the same length, width and thickness, the common length usually being 25 inches. It is customary to divide these cakes or block into bricks or pieces of such thickness that there shall result six bricks to the quart, seven bricks to the quart or eight bricks to the quart. Where it is desired to have six bricks to the quart, the cakes or blocks are cut into fifty-two bricks, where seven to the quart are desired the block is cut into sixty-two bricks, and in the case of eight to the quart, into seventy bricks. Since as already explained, two pieces or bricks extending in the same transverse plane are cut at each cutting stroke of the cutter means, after the first idle stroke of the transverse knife 14, the result is that when a cake is cut into six bricks to the quart, each brick or piece will be 1 inch in thickness, where there are seven bricks to the quart each will be approximately $\frac{8}{10}$ of an inch in thickness, and in the case of eight bricks to the quart the thickness of each brick will be approximately $\frac{7}{10}$ of an inch. As the effective feed stroke of the pawl 156 is dependent on the length of the tooth of the rack used, it will therefore be seen that by providing three separate racks having teeth 1 inch, $\frac{8}{10}$ of an inch and $\frac{7}{10}$ of an inch in length, respectively, the block 136 may be divided upon this machine into pieces of any one of the three usual thicknesses, the stroke of the pawl being suitably adjusted. Any suitable and usual means for variably adjusting the feeding stroke of the pawl 156 could be used, but herein, the triangular member 160 is pivotally connected to the arm 166 of the bell crank lever 168 by means of a removable pivot pin 192 at the lower right hand apex of said triangular member, referring to Fig. 2. The parts are so proportioned that when the triangular member 160 is thus pivotally connected by said lower right hand apex to the arm 166 of the bell crank lever, the feed stroke imparted to the pawl 156 will be a little over 1 inch, and it will be understood that with a feed stroke of that length the pawl 156 will feed the block 136 correctly whether the rack having teeth 1 inch in length or the rack having teeth $\frac{8}{10}$ of an inch in length, or the rack having teeth $\frac{7}{10}$ of an inch in length, is used, this one adjustment thus serving for dividing the block 136 into pieces of any one of the three usual thicknesses used as above set forth, for while in the case of the two racks having teeth of less of an inch in length, the pawl will at each rearward stroke be drawn backwardly somewhat more than is necessary beyond the end of each tooth, it will in its forward feed stroke always be moved a full inch, there being merely a slight lost motion at the beginning of the feed stroke. This adjustment for a feed stroke of a little over 1 inch will in fact answer for any tooth of an inch or less in length, as will be readily understood.

As has already been explained, the feed racks are secured to the feed carriage by dowel pins and are thus easily removable and interchangeable.

Sometimes, it is desired to divide the block 136 into pints, and the present invention contemplates means to enable this to be done. This is accomplished in a very simple and effective manner herein by withdrawing the stud 192 from the point where it pivotally connects the arm 166 of the bell crank lever to the lower right hand apex of the triangular member 160, as illustrated in Fig. 2, and inserting said stud in an opening 194 provided in the upper free end of said arm 166 and a similar opening provided in the upper right hand apex, see Fig. 2, of said triangular member 160, thus pivotally connecting the latter to the free end of said arm 166. When thus connected, the parts are so proportioned that the feed stroke of the pawl 156 is equal to a little over 3 inches, so that by using a rack having teeth 1 inch in length the block of ice-cream 136 will be fed forward three inches at each feed stroke of the pawl 156, and at each downward stroke of the cutters 14 and 150, two pieces situated in the same transverse plane and each 3 inches in thickness, that is to say, each corresponding to a pint, will be severed from the block 136. The invention also contemplates means for dividing the block 136 into quarts. Herein this is accomplished by the simple expedient of removing the knife 150 from the machine and leaving the triangular member 160 pivotally connected by its right hand upper apex, Fig. 2, to the free upper end of the arm 166, using at the same time a rack having teeth 1 inch in length. Under these conditions, the block 136 will be fed three inches at each feed stroke of the pawl 156, but as only the transverse knife 14 is used, a single block 3 inches in thickness and extending the full width of the block 136, and therefore equal to one quart, will be severed from the block 136 at each cutting stroke of the cutter means.

Means are herein preferably provided whereby the feed stroke which takes place after the last piece of the block or cake has been severed, shall be somewhat shorter than the preceding feed stroke, so that the follower 134 shall not be brought into a position to be struck by the knife 14 when it descends after the last feed stroke. This is accomplished, herein Fig. 8, by making the last teeth of the feed racks somewhat shorter than the others. By this means the last feed stroke will be sufficiently long to cause the last severed piece to pass on to the belt 112 but not sufficiently so to bring the followers 134 within reach of the descending knife 14, said followers stopping short of the path of movement of the latter. Thereafter, the pawl simply slides back and forth upon the smooth surface of the rack back of the last tooth without feeding the feed carriage, thus calling the operator's attention to the fact that the division of the block 136 has been completed.

When not in use, or when it is desired to retract the follower 134 to its initial position shown in Fig. 2, for the insertion of a fresh block of material to be cut, the pawl 156 is raised and the rod 158 is placed on a bracket 198, Fig. 4, projecting inwardly from its standard 200, Figs. 2 and 4, secured to the upper outer flange of the I-iron 2 by bolts 202, or in any other suitable manner.

As already stated, before starting the machine, the operator slides the block 136 of material to be cut forward until its leading end surface is substantially flush with the vertical plane in which the transverse knife 14 travels, and preferably means will be provided to indicate to the operator when the block has reached this position. Herein said means comprises a leaf spring 204, Figs. 2, 5 and 6, secured by screws 206 at one end to the upper surface of the transverse member 96 of the feed carriage with the free end of said spring projecting forwardly longitudinally of the upper flange of the I-member 4. Upon the under side of its free end said spring 204 is provided with a button 208 which is pressed downwardly into contact with the upper surface of said flange by the action of said spring, so that as the feed carriage is moved forward manually by the operative to bring the front end of the block 136 into position flush with the vertical plane in which the knife 14 travels, said button 208 will snap into a suitable recess 210 provided in its path of movement in the upper surface of the upper flange of said I-iron 4, the position of said recess 210 being chosen in such manner that engagement of the button 208 therewith will take place as the leading end of the block 136 reaches a position flush with the vertical plane in which the knife 14 travels. When the first feed movement of the feed carriage by the feeding mechanism takes place the spring 204 will yield upwardly and the button 208 will become disengaged from the recess 210 without offering any appreciable resistance to said feed movement.

Preferably means will be provided for separating the severed pieces one from the other so as to prevent transverse adjacent edges of successive pieces from adhering or freezing together again after they have once been severed from the main block, and also to facilitate the further manipulation or handling of said severed pieces. While the invention contemplates the provision of any suitable means for this purpose, said means in the illustrative embodiment of the invention herein disclosed comprises an endless belt or conveyer upon which the pieces are deposited as they are severed from the main block 136, said belt being fed, preferably intermittently, simultaneously with the feed of the said block 136. Herein, the endless belt 212, Figs. 1, 2, 3, 9, 10 and 11, is supported upon two rollers 214 and 216 extending transversely of the machine, the former journaled in bearings 218 adjacent the left end, Fig. 3, of the cutter block 194 and the latter in bearings 220 carried by brackets 222, 222 secured by screws 224, or in any other suitable manner to the other flanges of the I-irons 2 and 4, respectively, near the left end, Figs. 9 and 10, of the machine. Means are preferably provided automatically to take care of any shrinkage or stretching of the belt and to that end the bearings 218 in which the opposite ends of the roller 214 are journaled, are mounted upon the ends of rods 226, 226, Figs. 2 and 3, mounted for sliding movement in ears 228, 228 of brackets 230, 230 secured by bolts or in any other suitable manner, to the upper flanges of the I-irons 2 and 4. Upon each rod 226, between the bearing 218 and the ear 228 adjacent thereto, is provided a spring 232 which tends to push said rod outwardly, said springs thus taking up any slack of the belt due to stretching, and on the other hand, yielding in the event of any contraction of the belt, which latter is thus always maintained under the necessary tension. Upon one end of one of the trunnions 234, Figs. 8 and 9, of the roller 216, there is secured a pinion 236 which meshes with a gear 238 rotatably mounted upon a stud shaft screwed into a boss (not shown) upon the under side of a horizontal plate 240. This plate 240 is secured to the upper flanges of the I-irons 2 and 4 by screw bolts 242, being suitably spaced from the latter by sleeves 244 surrounding said bolts. At each side of the machine there extends upwardly a standard 246, said standards serving to support various parts hereinafter to be described, and being preferably integral with said plate 240. The gear 238 meshes with an idler pinion 248 rotatably mounted upon a screw stud 250 screwed into a box 252 on the outside of the left standard 246, Fig. 9. The pinion 248 meshes in turn with another pinion 254 rotatably mounted upon a stud 256, and the pinion 254 meshes with a gear 258 rotatably mounted upon a stud 260, said stud 256 and 260 being secured in bosses 262 and 264, respectively, projecting from the outer surface of said standard 246. Upon the hub of said gear 258 is mounted for rocking movement, an arm 266 having its free end pivotally connected by a link 268 with one arm 270 of a bell crank lever 270, 272 mounted for rocking movement upon a screw stud 274 which passes through a wooden block 276 fitted into the outer side of the I-iron 2, said screw stud 274 being screwed into the I-iron, Fig. 9, and thus also serving to hold said block in place in conjunction with another screw 278. The other arm 272 of the bell crank lever 270, 272 is pivoted to one end of a rod 280 having its other end pivotally connected at 282 with an actuating arm 284, said actuating arm being preferably integral with the bell crank lever 166, 168 of the feed mechanism for the material to be cut. The rod 280 will preferably be adjustably connected to the levers 284 and 272 by means of screw-threaded connections 286 and 288 with members 290 and 292 which are pivotally connected with said levers respectively.

The arm 266 has pivoted thereon a pawl 294 which is maintained in engagement with the teeth of a ratchet wheel 296 by means of a spring 298 secured to said arm 266 in any suitable manner, said ratchet wheel 296 being rigidly mounted upon the hub of the gear 258.

Figure 8:
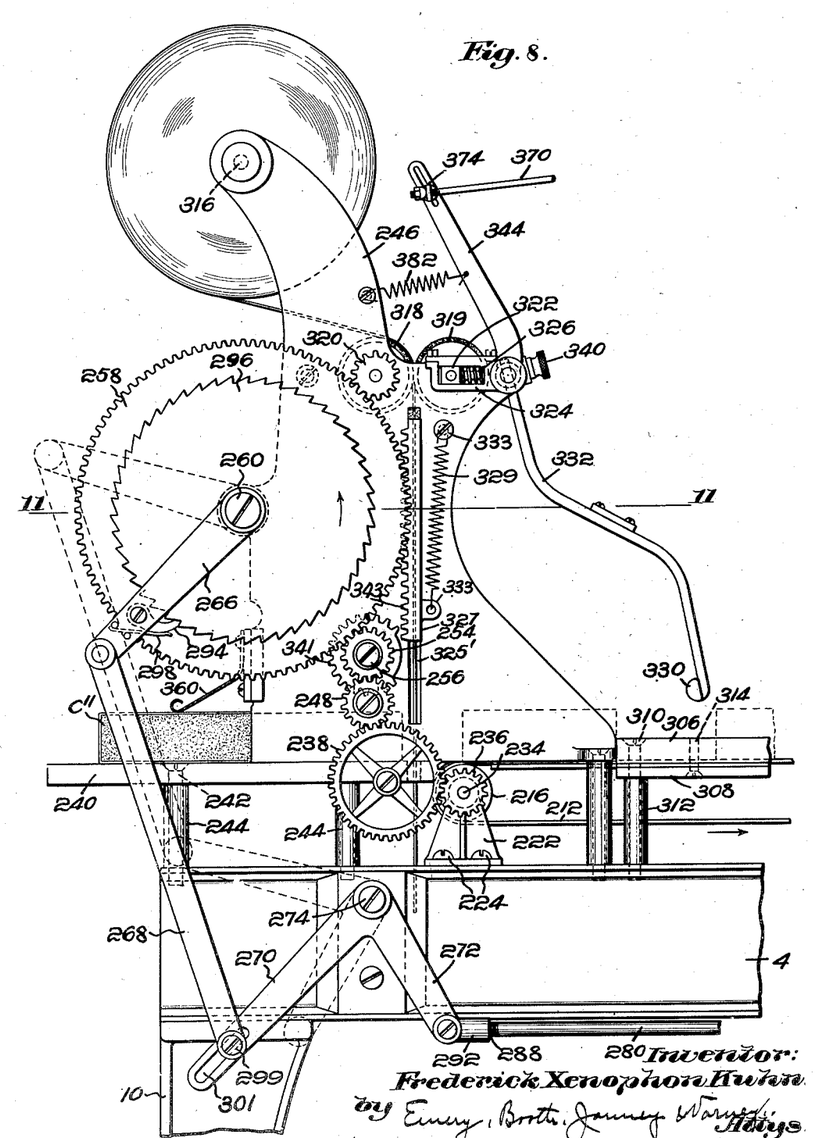
Fig. 8 is a side elevation on an enlarged scale of the parts shown in Fig. 1.

From the construction described, it will readily be seen that the swinging movement of the arm 284 produced by the operation of the bell crank lever 166, 168, acting through the rod 280, bell crank lever 270, 272 and link 268 will cause the arm 266 to swing about the stud 260, the pawl 294 sliding idly over the teeth of the ratchet 296 in each clockwise movement of said arm 266, Fig. 8, but engaging a tooth of said ratchet and turning the latter and the gear 258 connected thereto with said arm at each contraclockwise movement of the latter. The step by step movement thus imparted to the gear 258 will, through pinions 254, 248, gear 238 and pinion 236, impart an intermittent feed movement to the belt or conveyer 212. These feed movements of the belt 212 take place simultaneously with the effective feed movement of the pawl 166, so that as the pieces severed from the block 136 of ice-cream are pushed successively off of the end of the cutting block 104 and drop in succession upon the right hand end of the belt 212, which is suitably positioned with relation to the end of said cutting block to receive them, they will be conveyed away from said cutter block by said belt, the feed stroke of which is so regulated as suitably to space the severed pieces of ice-cream one from the other upon said belt as is shown in Fig. 1. It will be noted that the upper section of the belt 212 is located somewhat below the level of the upper surface of the cutting block 104, so that as the pieces of severed material are pushed off of the latter they will tip forward about their point of support through an angle of substantially 90° and rest upon said belt in a position substantially at right angles to that which they occupied upon the cutting block. When cutting pints or quarts, however, the severed pieces will simply be slid off of the cutter block onto the belt, without tipping.

The link 268 will preferably be adjustably connected to the arm 270, by a stud 299 provided with a clamping nut and engaging a slot 301 in said arm 270 for varying the stroke of the arm 266 and length of incremental feed movement imparted to the belt 212, as required.

It will thus be seen that the pieces of material severed from the block 136 are separated by the movement of the belt 212, in the direction of movement of the latter, and as they are being conveyed along by the belt or conveyer 212 they can very readily be removed from said belt and wrapped for packing. There appears to be no tendency of pieces of ice-cream situated in the same transverse plane to freeze together after they have once been separated by the knife, the action of the longitudinal knife in separating them, and their transfer onto the belt 212 evidently spacing them sufficiently so that they will not again freeze together.

In order to prevent the belt 212 from sagging, means will preferably be provided to sustain the upper section thereof intermediate the two rollers 214 and 216, said means herein consisting of a thin plate 300 of metal or any other suitable material over which the upper section of said belt travels, said plate 300 being clamped at its lateral edges between clamping blocks 302, 304, 306, 308 supported by studs 310 having their lower ends screwed into the upper flanges of the I-irons 2 and 4, said clamping blocks being suitably spaced from the upper surfaces of said I-irons by sleeves 312 surrounding said studs 310 between the upper surfaces of said I-irons and the under surfaces of the lower clamping blocks 304 and 308. Additional clamping screws 314, one of which is shown in Fig. 8, may be provided at suitable distances along said clamping blocks more firmly to clamp the edges of the sustaining plates 300 between said clamping blocks.

For the sake of convenience and also for sanitary reasons, it is preferable that the wrapping of the separate pieces of ice-cream be done mechanically, and to this end, the present invention contemplates the provision of wrapping means. One illustrative form or embodiment of such wrapping means will now be described.

Figure 9:
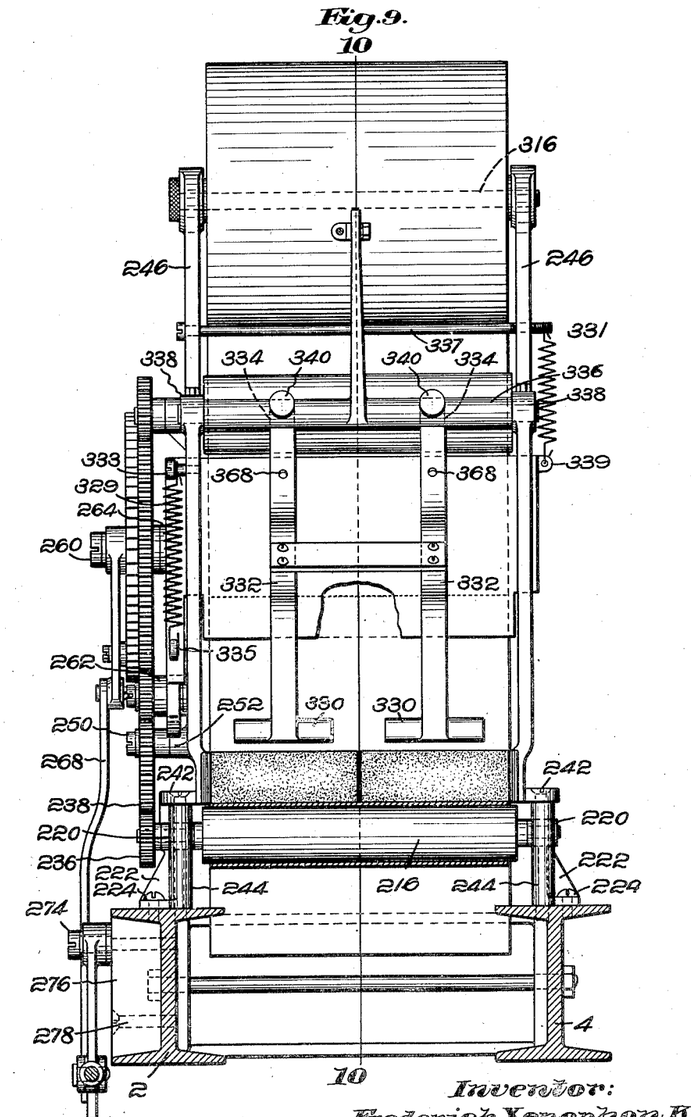
Fig. 9 is an elevation of the parts shown in Fig. 8, viewed from the right of the latter figure.
Figure 10:
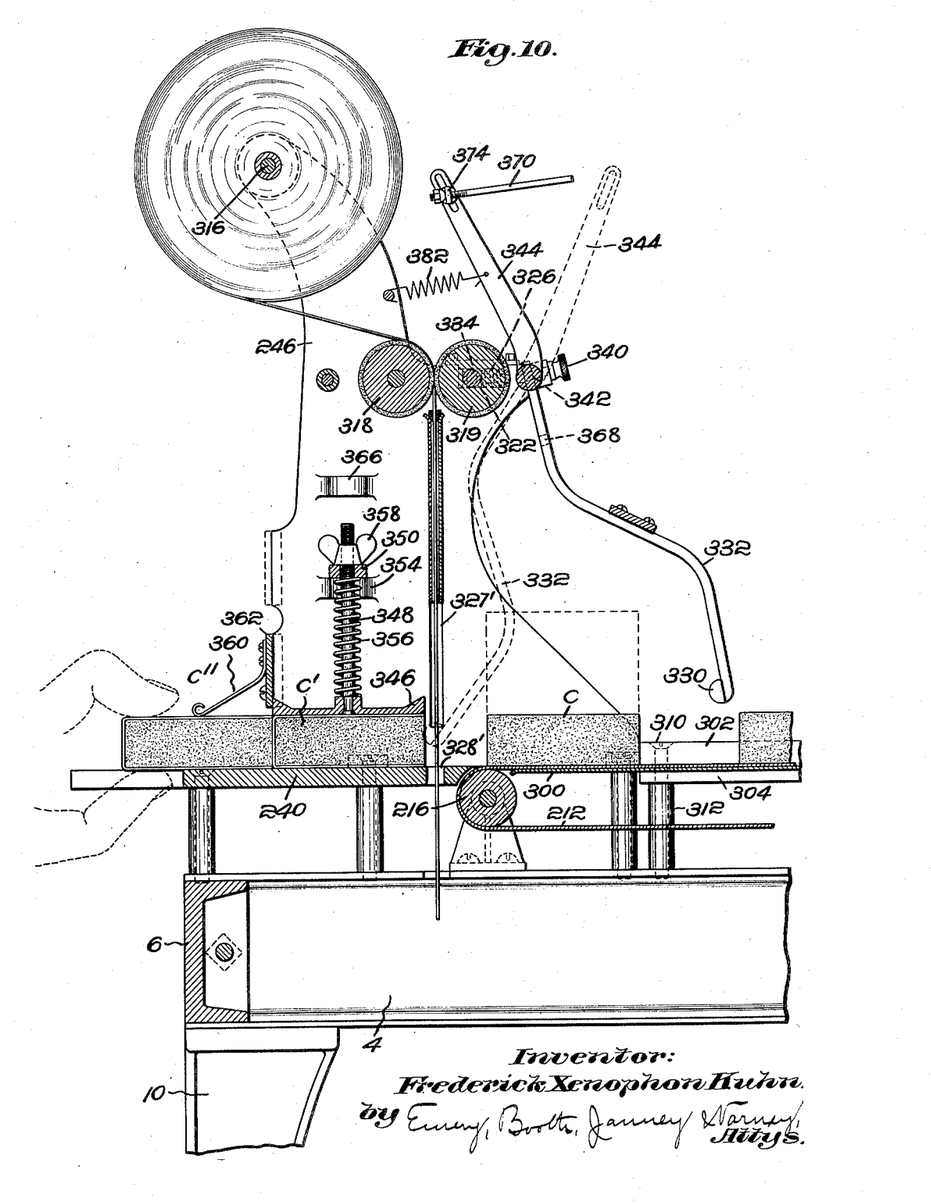
Fig. 10 is a section on line 10—10 of Fig. 9.

In the upper ends of the standards 246, 246, there is journaled in any suitable manner a roller 316, Figs. 9 and 10, for supporting in roll form, the paper to be used for wrapping purposes. When both knives 14 and 150 are used, thus simultaneously severing two pieces of material from the block 136, two separate rolls of paper, as shown in Fig. 9, will preferably be secured upon the roller 316, but where the knife 14 only is used, thus severing a single piece only, extending throughout the full width of the block 136, at each cutting stroke of the knife, a single roll of paper will preferably be used. The paper passes downwardly from the roll or rolls between two feed rollers 318, 319, one of which, 318 for example, has its trunnions journaled in the standard 246, 246, one of said trunnions extending through the standard 246 in which it is journaled and having rigidly secured to the end thereof outside of said standard a pinion 320 meshing with the gear 258. The other feed roll 319 has its trunnions journaled in blocks 322 slidingly mounted in bearings 324 provided in the standards 246, 246, springs 326 acting upon said blocks 322, 322 so as yieldingly to press the roll 319 toward the roll 318 and clamp the web of paper therebetween.

From the construction described, it will be apparent that at each contra clockwise movement of the arm 266 the feed rolls 318, 319 will be rotated through the gear 258 and pinion 320 and that a length of paper will be fed downwardly preferably through a guide herein consisting of two plates 321, 323, Figs. 10 and 11, secured in any suitable manner along their lateral edges to frame pieces 325, 327, guided in vertical slots 325', 327' provided in the standards 246, 246. The paper passes downwardly between the parallel plates 321, 323, which are suitably spaced by a portion of the frame pieces 325, 327 embraced between them, to allow free passage to the sheet of paper while effectively guiding it. In order more effectively to guide the paper and facilitate the wrapping operation, the paper guide will preferably be vertically movable, so that it can move downwardly into close proximity to the plate 240 with the paper as the latter is fed, and thus guide the paper and cause its free end to enter and pass through a slot 328', provided in the plate 240, as will be more fully explained. To this end, the guide is normally maintained in elevated position by springs 329, 331, the former having one end secured to a stud 333 fastened in the left standard 246, Fig. 9, and its other end secured to an ear 335 preferably integral with the frame member 327 adjacent its lower end. The spring 331 is secured at its upper end to one end of a rod 337 mounted in the standards 246, 246, the other end of said spring being secured to an ear 339 preferably integral with the frame member 325 adjacent the upper end of the latter. By providing two springs disposed as described, any tendency of the paper guide to bind in the slots 325', 327' in its vertical movement in the latter is prevented. Downward movement of the guide is effected by a gear 341 the teeth of which are adapted to mesh with teeth 343 provided upon the frame member 327, said gear 341 being integral with or rigidly secured to the pinion 254 which is driven by the gear 258 as already described. The teeth of the gear 341 extend about a portion of its periphery only, only so many teeth being provided as are necessary to move the paper guide downwardly the desired distance. The gear 341 makes one complete revolution, from substantially the position shown in Fig. 8 back to said position, for each effective stroke of the arm 266, and as the last tooth on the gear 341 becomes disengaged from the teeth 343 on the frame member 327, the latter will quickly be returned to its raised position shown in Fig. 8 by the action of the springs 329, 331.

As shown in Fig. 10, the horizontal plate 240 is provided at its right edge in said figure with a thin projecting lip which extends over the roller 216 of the feed belt and into as close proximity as possible with the upper surface of the upper section of the belt or conveyer 212 where the latter passes over the roller 216, the thin edge of said lip 328 being substantially level with the upper surface of the upper section of the belt 312 and in such close proximity thereto that the pieces of ice-cream upon said belt can readily be slid from the latter onto the upper surface of the plate 240.

Means is herein provided to transfer the severed pieces of ice-cream or other material from the belt or conveyer 212 to the plate 240 to cause the paper to be wrapped about it. In the embodiment of said means herein represented, there is provided a follower or pusher herein comprising two plates 330, 330 carried by the lower ends of arms 332, 332. The upper ends of said arms 332 enter slots 334, 334 provided in a transversely extending shaft 336 journaled for rocking movement in bearings 338, 338 provided in the standards 246, 246. The upper ends of said arms 332, 332 are firmly clamped in said slots by clamping screws 340, 340 which are received in suitable openings extending through the opposite walls of said slot, said screws passing through openings 342 provided in each of said arms. The shaft 336 is provided with an upwardly extending arm 344 which is connected to suitable actuating mechanism. It will be apparent that if the arm 344 be swung from the full line position in Fig. 10 into the dotted line position in said figure the pushers or followers 330, 330 will be swung from the full line position in Fig 10 into the dotted line position in said figure, and in this movement will engage the rear surfaces of the two pieces of ice-cream C C shown in full lines, see Figs. 11 and 12, and situated in the same plane nearest the delivery end of the belt 212 and will push said two pieces of ice-cream past the vertical plane in which the sheet of wrapping paper extends and under guide or presser plates 346, 346. These plates, which together with the plate 240 constitute what may be called wrapping instrumentalities or members, are carried by rods 348 which extend upwardly through suitable openings provided in a transverse bar 350 removably secured by screws 352, 352 to ears 354, 354 projecting inwardly from the two standards 246, 246. Between said plates 246, 246 and the bar 350, the rods 348 carry springs 356 and upon the upper screw-threaded ends of said rod 348, above said bar 350, there are provided wing nuts 358, whereby the tension of said springs and pressure of the plates 346 upon the pieces of ice-cream or other material received thereunder, may be regulated as desired.

As already stated, in practice it is customary to wrap the pieces of ice-cream upon three sides only since the main object of wrapping is to protect the separate pieces of ice-cream from adhering to each other or freezing together again when they are packed for delivery or shipment, and with three sides covered by paper it will be readily seen that the pieces can be packed side by side so that the separate pieces will be separated one from the other by the paper wrapping. Accordingly, the rolls of paper used herein will preferably be what is known as perforated paper, that is to say, the strips of paper are provided at intervals with a transverse line of perforations, extending from one edge to the other, so that the strip or sheet of paper may readily be divided at that point, and the length of paper between any two lines of perforations will be sufficient to cover three sides of the piece of cream to be wrapped.

Assuming that both knives are used so that two pieces, situated in the same transverse plane, are severed simultaneously by the cutter from the block 136, the mode of operation of the wrapping mechanism is as follows: As already explained, the feed movements of the belt 212 and of the wrapping paper are intermittent and simultaneous, the two pieces of cream C, Figs. 10 and 11, upon the belt 212 being thus advanced substantially into the position shown in said figure in full lines upon said belt and adjacent the latter's delivery end, and the strips of paper will have been fed downwardly by the feed rolls 318, 319 until the free ends of the strips extend a distance below the upper surface of the plate 240 substantially equal to the length of the under surfaces of the pieces of ice-cream to be wrapped resting upon the belt 212. The paper guide will have been moved downwardly with the paper in its feed movement as and for the purpose already described, and will then quickly have been raised again by its springs 329, 331. The lever 344 is now swung by its actuating mechanism from the position indicated in full lines in Fig. 10 into the dotted line position in said figure, and the pushers 330 are swung from the full line position in said figure into the dotted line position therein shown, thus advancing the two pieces of ice-cream C which were left in the same transverse plane at the end of the last feed movement, upon the belt 212 adjacent the delivery end of the latter, from the position C, Fig. 10, into the position C' on said figure under the plates 346, 346. In this movement the leading surfaces of the two pieces of ice-cream strike against the strips of paper and carry them along with them, bending the strips back over their upper and lower edges and severing the strips of paper at the first line of transverse perforations above the plate 240, and when the movement is completed the sections of paper thus severed will extend about the leading and upper and lower surfaces of each of the pieces of ice-cream as the latter come to rest between the upper surface of the block 240 and the under surfaces of the plates 346, 346. By regulating the downward pressure of the plates 346 so that the friction of the severed section of paper against the under surface of said plates and against the upper surface of the plates 240 will be substantially equal, the paper will be caused to extend equally over the upper and lower surfaces of the pieces of ice-cream. Another feed movement of the conveyer 212 and of the paper now takes place, thus bringing two more pieces of ice-cream into the position C, Fig. 10 and the necessary length of paper into position to be wrapped about them, also as shown in said figure. The pushers 330 are now again actuated as above described, advancing these two pieces of ice-cream from the belt 212 into the position C' shown in said Fig. 10, between the plates 346 and the plates 240 and pushing ahead of them from between said plates the two previously wrapped pieces of ice-cream, the latter assuming the position C", being held between the upper surface of the plate 240 and yielding holding means herein consisting of spring members 360 secured in any suitable manner to a plate 362 secured at its opposite ends in any suitable manner to the rear edges of the two standards 246, 246. The wrapped pieces are easily removed by an operative by hand as indicated in Fig. 10, the plate 240 being recessed at 364, see Fig. 11, to enable the operative more readily to grasp said wrapped pieces.

It is found in practice that for pieces or cakes of an inch or less in thickness, paper divided by transverse perforations into lengths suitable for pieces one inch in thickness will suffice. When pints or quarts are cut the distance between the perforations in the paper will of course be longer in order that the length may be sufficient to cover the three sides of the pieces or cakes. Also when operating upon pints or quarts, the plate 362 with attached spring fingers 360 is adjusted to a higher level and the plates 346 will be raised by disconnecting the ends of the transverse bar 350 by which they are sustained from the ears 354, 354 and securing the ends of said bar to similar ears 366 projecting from the inner surfaces of the standards 246, 246 above the ears 354, at a suitable height to permit the pint or quart cakes to pass between said plates 346, 346 and the upper surface of the plate 240 in the wrapping operation. Only one of said ears 366 is shown in the drawings, see Fig. 11. When operating upon pints and quarts, it is also preferable to raise the arms 332 by sliding them upward through the slots 334 in the shaft 336 until openings 368, Figs. 9 and 10, in said arms are engaged by the screws 340, by which the arms are then again secured in position in the shaft 336. This brings the pushers 330 into a position where they can act more effectively upon the pieces or cakes of pint or quart sizes.

It is sometimes preferable to wrap four sides of the severed pieces or cakes of icecream when the latter are of the pint or quart size. This can readily be accomplished with the wrapping mechanism above described simply by making the distances between transverse perforations of sufficient length for that purpose. In such case when the pieces or cakes are advanced by the pushers 330 beneath the plates 346, the lower front and top sides of the pieces will be wrapped as already described, and the paper will be severed at the first line of perforations above the cake, the extra length of paper for covering the rear side of the cakes remaining in the paper guide, and as said guide descends when the next feed movement of the paper takes place, this extra length will be withdrawn from the guide and will adhere to the rear surface of the cake or cakes beneath the plates 346, so that as the guide ascends again the extra length of paper will be left adhering to the rear surface of the cake or cakes and will be pressed into intimate contact therewith as the wrapped cakes are pushed from beneath the plates 346, 346 by the next following cake in the wrapping operation of the latter.

It will be noted that the downward movement of the paper guide is relatively slow, while its upward movement is relatively rapid, the latter being necessary in order to remove the guide promptly from the path of movement of the pieces of material being fed to the wrapping mechanism. The pushers 330 are also operated in such manner that their return stroke is relatively rapid, so that they may be removed promptly from the path of movement of the pieces or cakes of material being fed intermittently upon the belt 212. The invention contemplates the provision of any suitable mechanism for this purpose, but herein the desired result is obtained by connecting the lever 344 to the knife 14, preferably by means of a flexible connection 370 connected at 372 to said knife and adjustably connected at 374 to said lever 344, said connection passing over a sheave 376 mounted for rotary movement upon a stud 378 secured in an ear 380 projecting from one of the knife guides 15. A spring 382 is connected at one end to said lever 344 and at its other end to the rod 337 that extends between the two upright standards 246. With the pushers 330 in the full line position in Fig. 10, downward movement of the knife 14 will swing them into the dotted line position in said figure to feed the severed cakes to the wrapping mechanism as already described, and when at the end of its cutting stroke the knife 14 is quickly raised by the action of the springs 66, the spring 382 will quickly return the pushers 330 to their full line position, Fig. 11.

The shaft 58, Fig. 3, will preferably be provided with a ratchet 384 engaged by a pawl 386 pivoted at 388 to the frame, to prevent the machine from being inadvertently reversed.

In the operation of the machine it is found that particles of the material being cut are liable to adhere to the knife and means will therefore preferably be provided to clean the knife as much as possible while removing therefrom between strokes the material that may adhere thereto. Said means herein comprises two plates 390 and 392 extending transversely of the machine and secured by clamping screws 394, Fig. 2, to the guides 15 for the knife 14 provided at opposite sides of the machine as already described. The screws 394 are mounted in bosses 396, 396 provided on said guides and said screws project through suitable openings provided in the opposite ends of said plates 390, 392 and receive upon their outer ends wing nuts 398, 398 whereby said plates are firmly clamped in place. The plate 390 is provided with a bottom portion 400 which extends inwardly with its edge in close proximity to the path of movement of the knife 14, while the plate 392 is provided with a bottom portion 402 that inclines downwardly toward the knife with its lower edge in close proximity thereto. Both plates 392 and 390 are preferably latticed, as shown in Fig. 4, and the plate 390 is provided with a projecting portion 404 which extends over the leading end portion of the advancing cake 136 while the latter is being cut and prevents any tendency of said leading end portion to move upwardly with the knife in the latter's upward motion. Said projecting portion 404 is provided with a central longitudinal slot 406 which communicates at its inner end with a vertical slot 408 provided in the plate 390, the knife 150 moving up and down in said slot in the reciprocating movements of the cutter. Any suitable moisture retaining material 410, such as sponge rubber for example, will preferably be packed between the plates 390 and 392 and the knife 14 and at each side of the knife 150, and as the knives reciprocate this material by its contact therewith will remove therefrom any particles of the material being cut that may adhere thereto. This sponge rubber or other material 410 may be kept moist by adding thereto water from time to time.

It has been found desirable to provide some method of insuring the registering of the edges of the several pieces or cakes with the edges of the paper that is about to be wrapped around said pieces, and for this purpose I have illustrated inclined guides 411, at opposite sides of the conveyer 212, and substantially immediately in front of the paper guiding and feeding instrumentalities (see Fig. 11), said guides being adapted to engage the outer edges of the pieces provided they project too far and deflect them inwardly into proper alinement with said paper strip.

It is believed that the operation of the machine will be readily understood in view of the descriptions of the operation of the various parts given from time to time in describing the mechanism, and a further description of the operation of the machine is therefore deemed unnecessary.

It will be seen that the machine embodying the invention is simple in construction, efficient and rapid in operation, very easily operated and extremely sanitary, as the cakes or blocks to be cut up can be placed in the machine directly from the molds, without touching the cream itself, and can thus be cut up or divided and wrapped on the machine without any necessity of touching the cream in any way, shape or manner.

It will be apparent that it is not essential that all of the features of the invention be used conjointly, since they may be used to advantage separately in various combinations and sub-combinations. It is also to be understood that while the invention is herein described as embodied in the details illustrated, the invention is not to be considered as circumscribed by or limited to these details, or any of them, but the said details may be variously modified within the true scope of the invention which is definitely set forth in the claims.

Claims:

1. In a cutting or slicing machine, in combination, cutter means including transverse and longitudinally extending cutter blades; means removably to secure said longitudinally extending cutter blade to said transverse cutter; actuating mechanism for said cutter means; and means to feed the material to be cut to said cutter means.

2. In a cutting or slicing machine, in combination, cutter means including transverse and longitudinally extending cutter blades extending transversely and longitudinally of the machine; means removably to secure said longitudinally extending cutter blade to said transverse cutter means; actuating mechanism for said cutter; and means to feed the material to be cut to said cutter means.

3. In a cutting or slicing machine, in combination, cutter means; actuating mechanism therefor; means to feed the material to be cut to said cutter means, including a conveyer upon which the material to be cut is placed; actuating mechanism to move said conveyer, with the material to be cut thereon, toward the cutter means; means to effect the turning of the cut pieces upon their sides; and means to separate the pieces into which the material is cut by said cutter means.

4. In a cutting or slicing machine, in combination, cutter means; actuating mechanism therefor; means to feed the material to be cut to said cutter means, including a conveyer upon which the material to be cut is placed; actuating mechanism to move said conveyer, with the material to be cut thereon, step by step toward the cutter means; means to effect the tipping of the cut pieces of material; and means to separate the pieces into which the material is cut.

5. In a cutting or slicing machine, in combination, cutter means; actuating mechanism therefor; means to feed the material to be cut to said cutter means, including a carriage and a flexible member attached to and movable with said carriage upon which the material to be cut is placed; actuating mechanism to move said carriage, with the material to be cut thereon, step by step toward the cutter means; an adjustable connection to vary the length of the step by step feed stroke of said feeding means actuating mechanism; and means to separate the pieces into which the material is cut.

6. In a cutting or slicing machine, in combination, cutter means; actuating mechanism therefor; means to feed the material to be cut to said cutter means; including a carriage, and a flexible member attached to and movable with said carriage upon which the material to be cut is placed, stationary means to guide said flexible member to said cutter means, actuating mechanism to move said carriage, with the material to be cut thereon, step by step toward the cutter means; adjusting means to vary the length of the step by step feed stroke of said feeding means actuating mechanism; and means to separate the pieces into which the material is cut.

7. In a cutting and slicing machine, in combination, a cutter, a cutter block against which said cutter is adapted to be moved during the cutting operation the rear edge of said block being at a distance from said cutter less than the thickness of the slice to be cut to effect the tipping of the severed portions of material, a conveyer to receive the material from said cutter and means to operate said conveyer to receive said cut portions in spaced relation.

8. In a cutting or slicing machine, in combination, cutter means; actuating mechanism therefor; and means to feed the material to be cut or sliced to said cutter means, said feeding means including a feed carriage adapted to receive racks having differently spaced teeth, a flexible member attached to said carriage to be moved thereby to and beneath said cutting means, a pawl and pawl actuating mechanism for reciprocating said pawl so as to cause it to coöperate with said differently spaced rack teeth to feed said carriage step by step by different increments.

9. In a cutting or slicing machine, in combination, cutter means including a transverse and a longitudinally extending cutter blade; means removably to secure said longitudinally extending cutter blade in said cutter means; actuating mechanism for said cutter means; means to feed the material to be cut to said cutter means, and means to separate the pieces into which the material is cut by the cutter means.

10. In a cutting or slicing machine, in combination, cutter means including a transversely and a longitudinally extending blade; means removably to secure one of said cutter blades in said cutter means; actuating mechanism for said cutter means; means to feed the material to be cut to said cutter means; and means to separate the pieces into which the material is cut.

11. In a cutting or slicing machine, in combination, cutter means; actuating mechanism therefor; means to feed the material to be cut to the cutter means to cause it to be cut into pieces by the latter; and means to separate the pieces into which the material has been cut, including a conveyer having its material supporting surface disposed below the supporting surface of said cutter means, to effect the turning of the severed pieces of material.

12. In a cutting or slicing machine, in combination, a cutter having a blade extending throughout the width of the material to be cut and a blade extending longitudinally of said material; means removably to secure one of said blades to the other; means to feed the material to be cut to said cutter; and means to actuate the latter.

In testimony whereof, I have signed my name to this specification.

FREDERICK XENOPHON KUHN.